United States Patent [19]

Orwig et al.

[11] 3,939,287
[45] Feb. 17, 1976

[54] STERILIZING APPARATUS AND PROCESS

[75] Inventors: David F. Orwig; Robert G. Roecklein, both of Kirkwood, Mo.

[73] Assignee: Spicecraft, Inc., St. Louis, Mo.

[22] Filed: June 17, 1974

[21] Appl. No.: 479,987

[52] U.S. Cl. ............... 426/316; 21/91; 21/DIG. 4; 53/112 B; 99/472; 99/516

[51] Int. Cl.². A23L 3/34; B65B 31/04; B65B 55/00

[58] Field of Search .................... 99/467, 472, 516; 53/112 B; 21/91, DIG. 4; 426/418, 410, 419, 316

[56] References Cited
UNITED STATES PATENTS

| | | | |
|---|---|---|---|
| 2,978,336 | 4/1961 | Morrison | 426/393 |
| 3,220,157 | 11/1965 | Buchner | 53/112 B X |
| 3,466,841 | 9/1969 | Rausing | 21/91 X |
| 3,511,022 | 5/1970 | Finley | 21/DIG. 4 |
| 3,708,952 | 1/1973 | Schulze | 53/112 B |

Primary Examiner—Harvey C. Hornsby
Assistant Examiner—Alan Cantor
Attorney, Agent, or Firm—Charles B. Haverstock

[57] ABSTRACT

An apparatus and process for sterilizing substances and particularly food products such as food spices and seasonings which are in a processed or unprocessed condition and are in a powdered, granular, flaky, leafy or similar conditions, the apparatus including means for subjecting the product while in a container such as a plastic or plastic-like bag, first to a subatmospheric condition and thereafter injecting a gaseous sterilant at a central location in the product whereby the sterilant diffuses outwardly through the product toward the walls of the container sterilizing the product in the process and gradually escaping through the container leaving the packaged product in a sealed closed and sterilized condition. The invention resides in the apparatus used for sterilizing and in sterilizing process which may include additional steps of back flushing especially when relatively large containers of products are sterilized and where it is desired to shorten the time when the packaged product is safe to handle, ship and use.

16 Claims, 6 Drawing Figures

STERILIZING APPARATUS AND PROCESS

Numerous means and methods have been devised in the past to sterilize products including spices and seasonings in order to reduce the bacteria count for some reason as to meet certain standards or requirements of product safety. All known devices for this purpose and the methods associated therewith require extremely expensive equipment including especially constructed sealed storage containers into which the substances to be sterilized are positioned while subjected to a sterilant usually introduced under pressure after the container is first evacuated. Such storage containers are large and costly to build, they require fairly complex controls, they usually must be cycled by a fairly complex cycling procedure, and the quantities of sterilant required involve considerable danger including dangers of fire and explosion. The known devices and processes are also very slow acting and very inefficient mainly because in the known processes the sterilant must penetrate into the product being sterilized from outside rather than starting from a central location in the product, and all known devices as indicated must be programmed and cycled as to many variables in their operations. Furthermore, requiring that the sterilant penetrate the product, not only makes the known processes very time consuming, but it also means that the known processes do not achieve uniform sterilization for the reason that the sterilant rarely penetrates the product uniformly. It is for these reasons also that the known processes require many hours and even days depending on the quantities involved, and the quantities of sterilant that must be kept on hand as well as the amount required in each operation represents a considerable safety hazard. As already mentioned, the cost and complexity of the equipment involved in known processes is also extremely expensive, too inefficient, and too slow acting to be practical for use on a large scale, and the known equipment for all practical purposes is unavailable to the medium and small operators. For these and other reasons known sterilizing equipment and processes have enjoyed relatively limited usefulness and have not been able to satisfy the need of being able to sterilize many different products.

The present invention overcomes these and other disadvantages and shortcomings of the prior art by teaching the construction and operation of relatively inexpensive sterilizing means representing a small fraction of the cost of known equipment used for the same and similar purposes, and yet are much more efficient than known devices, less time consuming, and provide far better, more uniform and more complete bacteria kills than provided by any known devices. Furthermore, the subject device can be operated successfully with relatively little risk to personnel or equipment and by persons having relatively little skill and training, and products sterilized using the present means are relatively more free of bacteria and can be handled, used, and shipped without much risk. Still further, the present means and processes lend themselves to use by large as well as by small concerns without involving a substantial capital expenditure, and they can be used efficiently to sterilize large as well as small batches of a product in an efficient manner.

It is therefore a principal object of the present invention to provide improved and more efficient means for sterilizing products including food products.

Another object is to provide relatively simple, inexpensive, and easy to operate means for sterilizing products such as food spices and seasonings.

Another object is to provide means for more uniformly sterilizing food products.

Another object is to enable persons having relatively little skill and training to be able to very precisely and uniformly sterilize food products.

Another object is to provide means to substantially reduce the bacteria count in food products, especially the count of harmful or potentially harmful bacteria thereby minimizing the possibility of food poisoning and without any damage or loss of flavor to the product.

Another object is to provide relatively compact and efficient sterilizing means which take relatively little floor space and can be used to sterilize on a mass production or on a piece meal basis.

Another object is to provide means to introduce a sterilant substance at a central location in a mass of the substance being sterilized.

These and other objects and advantages of the present apparatus and method will become apparent after considering the following detailed specification which covers several embodiments thereof in conjunction with the accompanying drawings, wherein.

Figure 3:
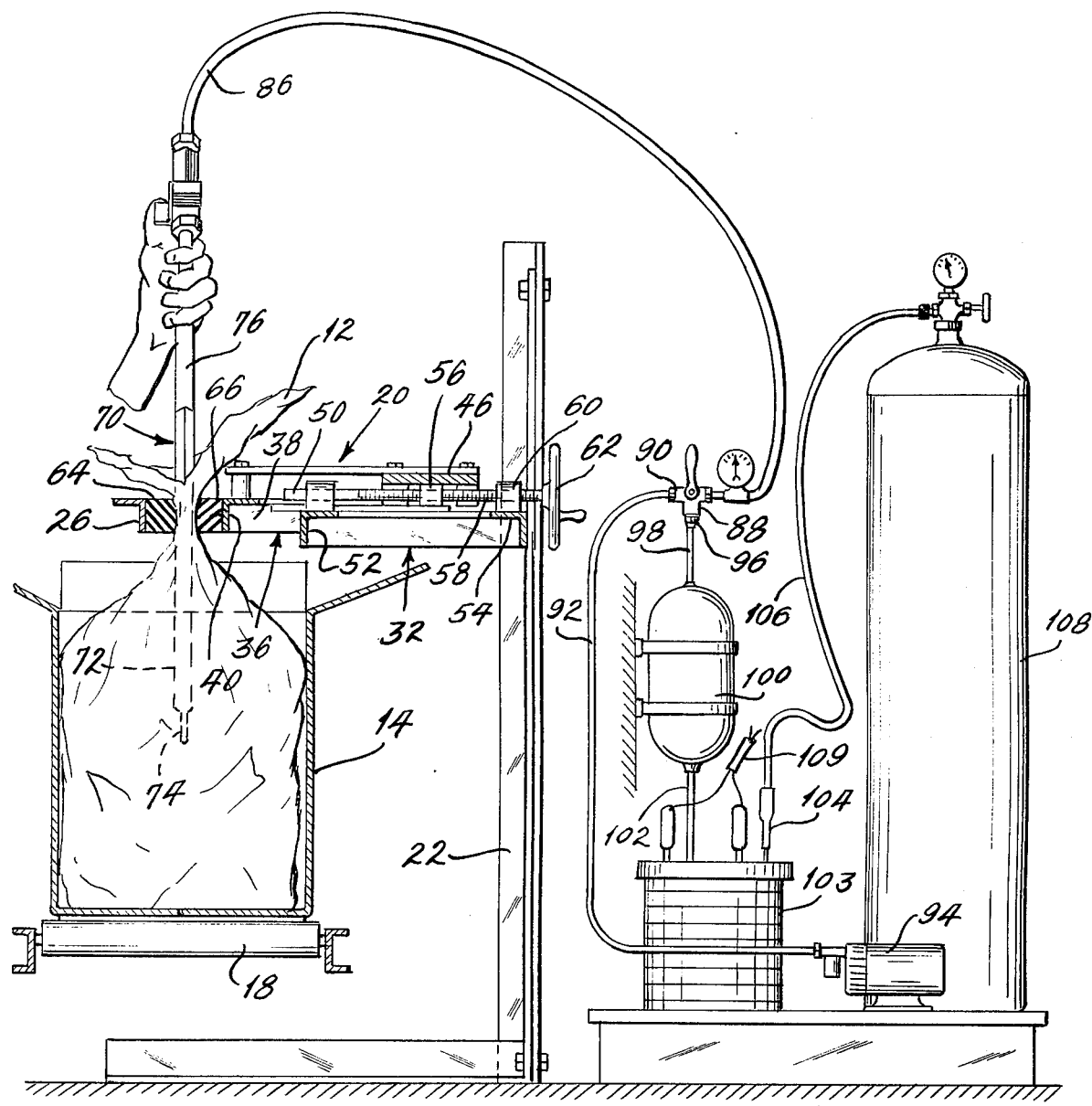
FIG. 3 is a cross-sectional elevational view taken on line 3—3 of FIG. 2.
Figures 4, 5:
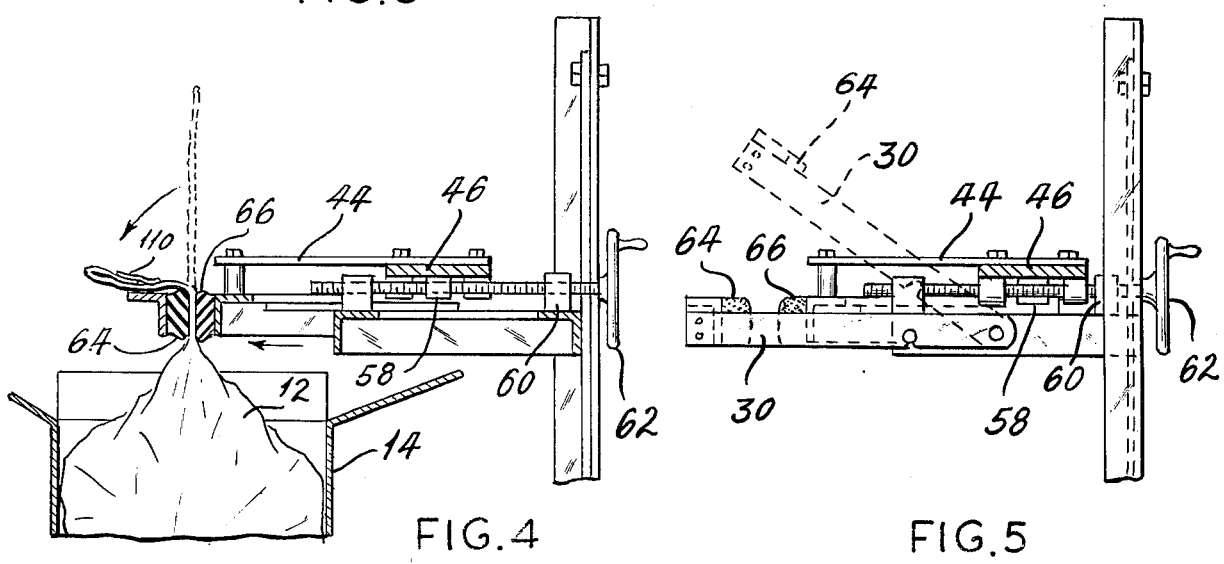
FIG. 4 is a fragmentary cross-sectional view showing the device after the probe assembly has been removed therefrom.
Figure 6:
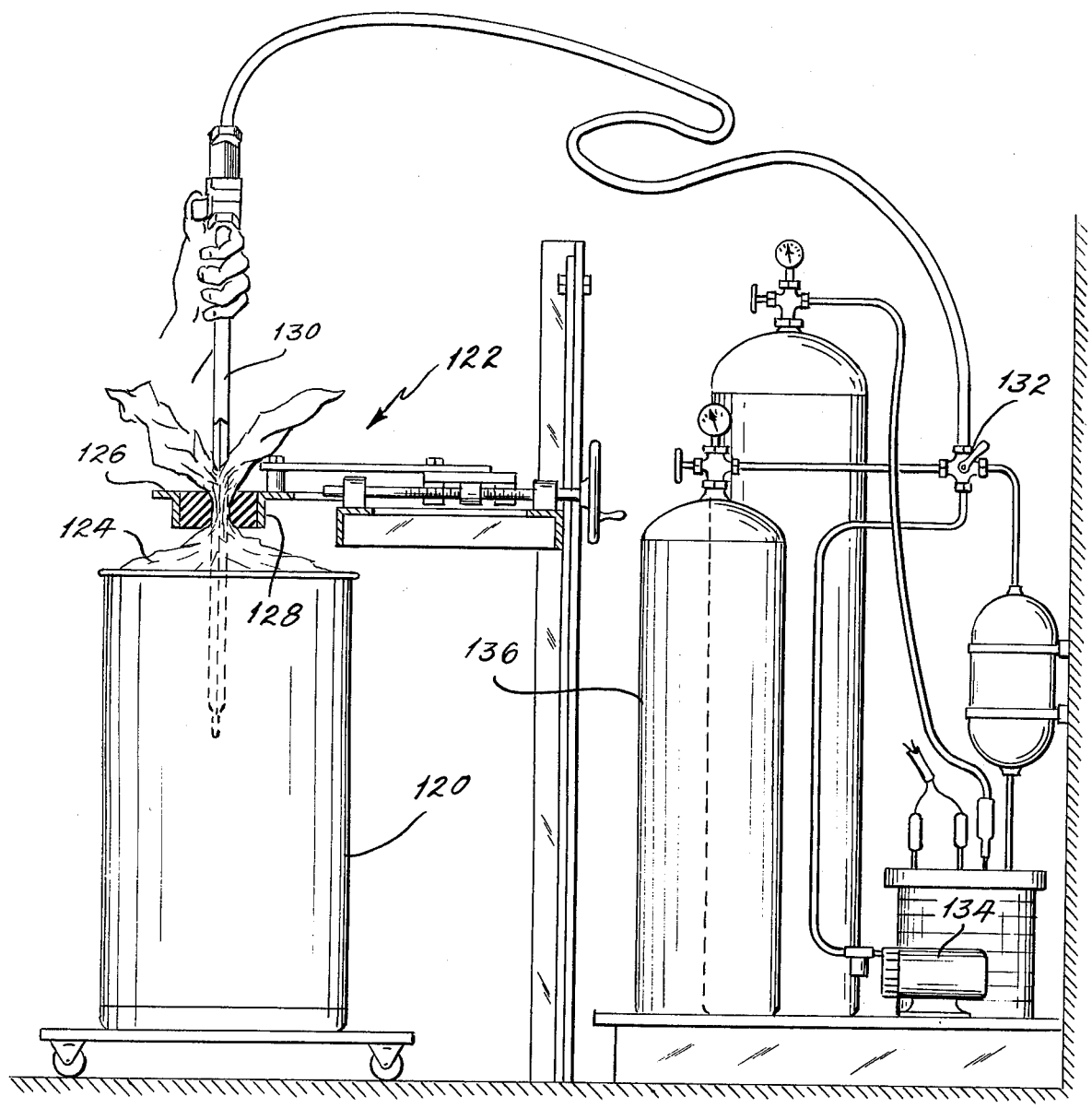

FIG. 5 is a fragmentary cross-sectional view similar to FIG. 4 showing the apparatus with the movable clamping jaw member in operative position in solid outline and in an alternative inoperative position in dotted outline; and, FIG. 6 is a view similar to FIG. 3 but showing a modified form of the device wherein the probe assembly is used to perform the additional functions of back flushing a container of a sterilized substance to remove any residual sterilant in order to reduce the time until the container can be safely handled and shipped.

Referring to the drawings more particularly by reference numbers, number 10 refers to an apparatus for sterilizing products such as spices, food seasonings and other similar products in order to reduce the bacteria content without damaging the product. It is well known to sterilize food and other substances to make them safe to use by exposing them to a sterilant such as a gaseous sterilant, and several such sterilants commonly used for this purpose include ethylene oxide and propylene oxide. As explained above, however, there are no known means for introducing such a sterilant centrally into the product being sterilized whereby the sterilant which is usually in a gaseous condition can move outwardly in all directions through the product from where it is introduced to kill unwanted bacteria in an efficient and expeditious manner. All known means and methods for sterilizing such products have involved placing the product to be sterilized while in some sort of a container into a sealed enclosure which is then evacuated and thereafter charged under pressure with a gaseous sterilant. The sterilant must then penetrate into the product beginning by starting at the exposed surfaces and working through the product toward the opposite surfaces thereof in order to perform a complete sterilizing operation. This is very time consuming and costly and requires expensive equipment with means to control the pressures and temperatures involved, and such means also require relatively large quantities of the sterilant, a requirement that adds to the danger factor. The known means also take considerable time to operate and usually require complicated controls which not only regulate the environment but also cycle the equipment. All of these and other factors make the known means and methods undesirable, inefficient and expensive. Even the best known sterilizing means have not been able to produce products with as low bacteria counts as the present means and have not been able to satisfy many standards presently required by government and industry. Because of these shortcomings the known devices have not enjoyed wide usage and for the most part have been too expensive, too inefficient and too time consuming to be used by many concerns and especially by the middle and small sized companies such as medium and small spice dealers and others faced with problems of meeting certain standards of sterilization.

Several forms of the present device are disclosed in this application and will be described. One form is designed primarily to be used to sterilize relatively small quantities of substances such as quantities up to 50 or 100 pounds. Another embodiment is for sterilizing larger quantities where it may take too long for the sterilant to escape naturally from the containers, and therefore for safety and other reasons it may be desirable to purge the containers of the remaining sterilant before shipping, using or otherwise handling the product. In these cases it may be desired to back flush the product containers to remove as much of the residual sterilant as possible, and this is usually done at a later time after the sterilizing operation has been accomplished and the sterilant has served its purpose.

The first embodiment of the device is shown and described in conjunction with FIGS. 1–5 and is used for sterilizing a 50 pound container of spice, the spice being positioned in a plastic bag 12 which in turn is positioned inside of a cardboard corrugated container or box 14 for convenience in handling and shipping. The cardboard container 14 is shown supported on a conveyor bed 16 formed by a plurality of spaced rollers 18 as clearly shown in FIGS. 2 and 3. In this position, and with the box 14 open, the upper open end of the bag 12 extends upwardly from the container.

In the position described the container 14 is located adjacent to the apparatus 10 and is under an overhead frame portion 20 which is supported in an elevated position by legs and braces such as the leg and braces 22 and 24. The overhead frame 20 includes a first frame portion 26 which is U-shaped and is pivotally attached by pivot means 28 and arms 30 to a fixed overhead frame structure 32. The fixed frame structure 32 is attached to the leg and brace members 22 and 24 and extends outwardly therefrom over the conveyor 16. A pair of fixed stops 34 on the fixed frame 32 are engagable by the legs 30 on the pivot frame 26 to maintain the pivot frame 26 in a horizontal position during operation of the device.

The frame structure 20 includes another frame portion 36 which is also U-shaped having spaced side members 38 and a member 40 connected therebetween. The side members 38 are channel shaped in cross-section and are mounted for sliding engagement on portions 42 of the fixed frame structure 32. The frame portion 36 is connected by two spaced members 44 to a movable slide member 46 that has spaced crossbores 48 which slidably receive and cooperate with shafts 50 connected extending transversely across the fixed frame structure 32 between spaced fixed frame members 52 and 54. The slide 46 has a threaded bushing 56 attached to it at the location indicated in FIG. 1, and the bushing cooperatively receives a threaded shaft 58 which extends therethrough and is rotatably supported by another bushing 60 located on the frame member 54. The end of the shaft 58 at the rear of the frame 20 carries a crank wheel 62 which when rotated in one direction moves the slide 46 and the connected frame 36 in a forward direction and when rotated in the opposite direction moves the frame 36 in the opposite or rear direction.

The rear surface of the cross portion of the pivot frame 26 has a layer 64 of a relatively resilient padding material attached thereto, and the cross portion 40 of the movable frame 36 has a similar layer 66 of padding attached to its forward surface. The layers 64 and 66 are movable into and out of cooperative engagement under control of the crank wheel 62.

Figure 1:
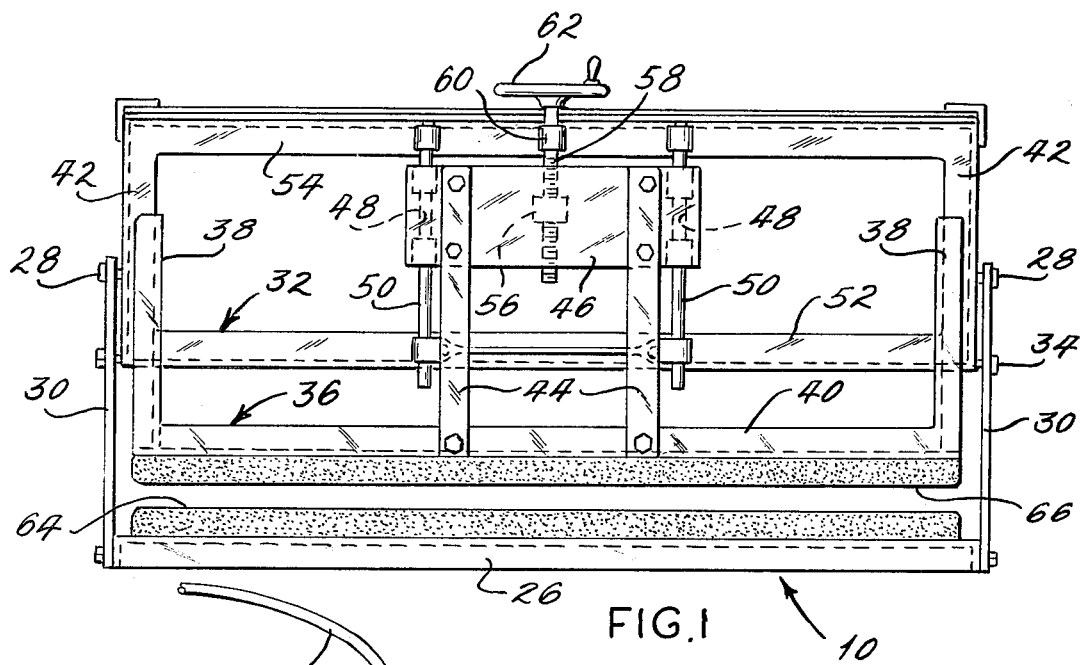
FIG. 1 is a top view of a sterilizing apparatus constructed according to the present invention.
Figure 2:
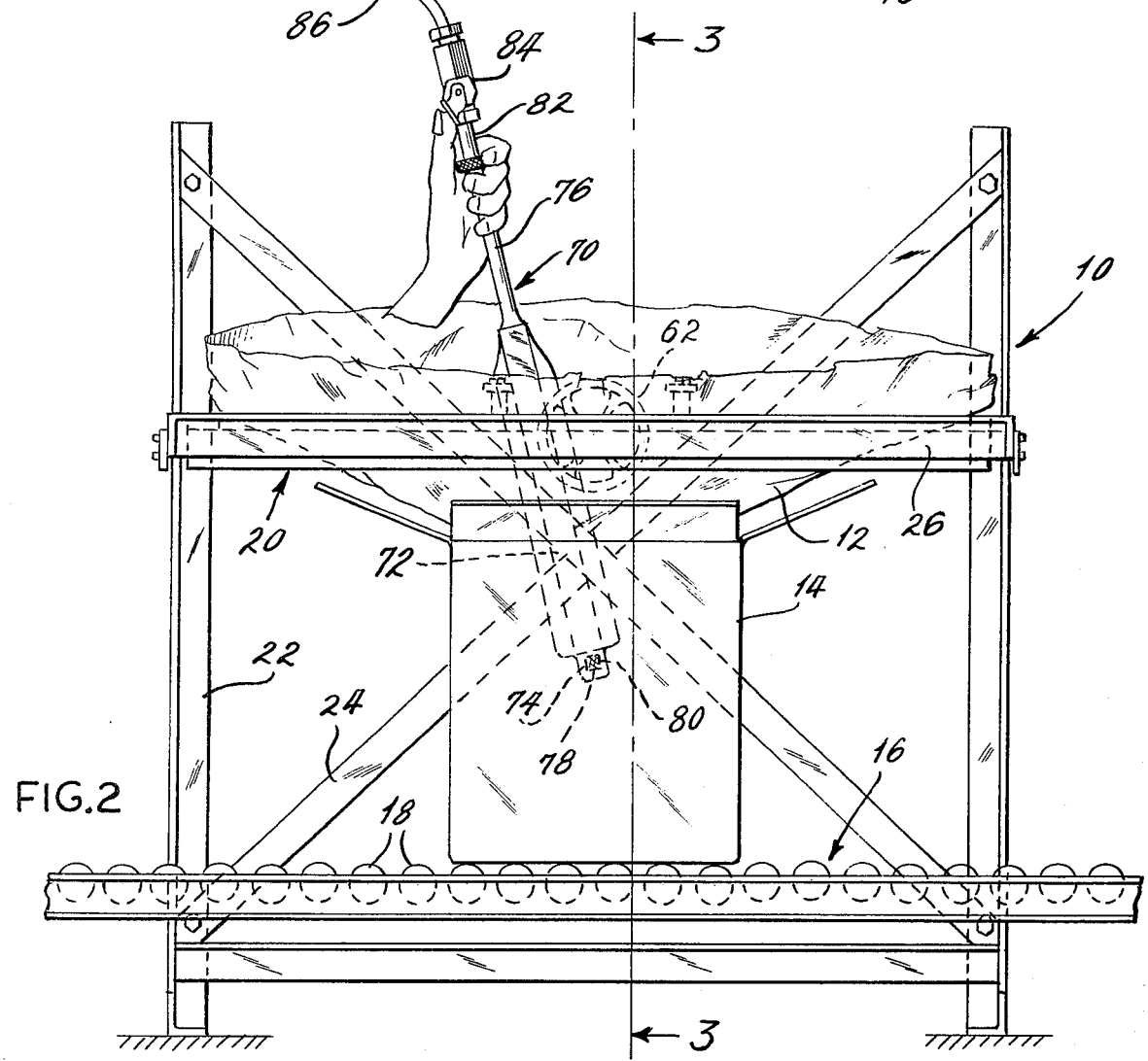
FIG. 2 is a front elevational view of the sterilizer shown in FIG. 1 showing a sterilizing probe assembly positioned in its operative position.

To operate the present device the upper open end of the bag 12 is laid against the padding layer 66 on the frame 36 as shown in FIGS. 2 and 3 and is smoothed out as much as possible. This is preferably done with the pivot frame 26 in its upwardly pivoted out of the way position. Thereafter, the pivot frame 26 is lowered to the horizontal position shown in FIGS. 1 and 2 and the crank wheel 62 is rotated in a direction to move the frame 36 forwardly toward the frame 26 but preferably not into engagement therewith. While in this position, and with the frame members 36 and 26 fairly close together, the operator will open the bag and insert a probe assembly 70 downwardly into the space between the frames 36 and 26 and into the bag 12. The probe assembly 70 is important to the invention and includes a hollow member having an elongated paddle shaped tubular probe portion 72 which is formed by spaced wall portions. The probe 70 narrows down or becomes more pointed at its free end 74 which is the end that is inserted and it has a connected cylindrical portion 76 at the opposite end. The free end of the probe assembly 70 has an opening 78 over which a fine mesh screen 80 extends and is provided to minimize the possibility that any of the spice or other product being sterilized will be able to enter the probe.

The tubular end 76 of the probe assembly 70 is provided with fitting means 82 and optional valve means 84 and is connected to one end of a flexible tube 86. The opposite end of the tube 86 is connected to an outlet port of multi-position valve means 88, and the valve 88 has a first inlet port 90 which is connected by another conduit 92 of the suction inlet of vacuum pump 94. Another inlet port 96 of the valve 88 is connected by another conduit 98 to the outlet side of a gas storage device or tank 100 which has its inlet connected by conduit 102 to the outlet side of a gas vaporizer device 103. The vaporizer device receives liquefied sterilant at its inlet 104 through a conduit 106 which is connected to the outlet of a storage tank 108 so that the vaporizer receives liquefied sterilant at its inlet and discharges vaporized sterilant at its outlet to the gas storage tank 100 for feeding to the probe assembly 70 under control of the valve 88. The vaporizer 103 also has electric input connections 109 which provide heater power thereto.

In operation, the free end 74 of the probe assembly 70 is inserted into the bag 12 in the space between the resilient pads 64 and 66 as aforesaid and is pushed down into the product contained in the bag so that the free end of the probe is located somewhere near to the center of the bag and near the center of the product contained therein as shown in FIG. 2. With the probe 70 in this position the crank wheel 62 is rotated to move the movable frame member or jaw 36 toward the frame member 26 which is in fixed position. This presses the resilient pads 66 and 64 together against opposite sides of the bag 12 and against opposite sides of the probe 70 to sealably close the bag around the probe and to support the probe.

When the probe is supported as indicated and the bag is sealed closed, the valve 88 is moved to a position communicating the probe 70 with the vacuum pump 94 to draw a vacuum on the bag and to remove as much air from the bag as possible. To some extent the amount of vacuum drawn will determine the efficiency of the sterilizing operation. For instance, the greater the vacuum pressure drawn the more air will be removed and consequently fewer bacteria will remain in the bag. Various vacuum pressures have been tested and it has been determined that for most purposes a vacuum pressure in a range from about 10 to about 26 inches of mercury provides good results. Much harder vacuums such as vacuums drawn down greater than about 26 inches of mercury have also been tested and used but the expense of the equipment required to obtain these vacuum conditions and additional time necessary usually is not warrented in view of the relatively little additional benefit achieved by doing so.

After the desired subatmospheric pressure condition has been achieved and the plastic bag is compressed hard onto the product, the valve 88 is moved to another of its operating positions communicating the interior of the bag through the probe assembly 70 with the gaseous sterilant storage tank 100 which feeds, under pressure, gaseous sterilant into the bag 12. The pressure of the gaseous sterilant that is introduced is usually only a few pounds per square inch above atmospheric pressure and this is sufficient to fill the bag, entering at the free end of the probe assembly 70 and moving outwardly therefrom through the product. The introduction of the gaseous sterilant will usually cause the bag 12 to balloon outwardly to some extent, and this condition can be maintained as long as desired to equalize the pressure in the bag to the pressure at the outlet of the storage tank 100. Ordinarily this takes only a short period of time and is easy to detect. The valve 88 is now returned to its neutral or non-operative position.

Next the operator releases some of the pressure applied to the bag and to the probe assembly 70 by the jaws 36 and 26 by turning back on the crank wheel 62. This is preferably done without breaking the seal on the bag but sufficiently to enable the probe assembly 70 to be withdrawn. The condition after withdrawal of the probe 70 is illustrated in FIG. 4. The operator now folds the open end of the bag as shown and applies an adhesive strip or tape 110 to the folded over end of the bag to seal the bag closed. The open end of the bag could also be otherwise closed and/or sealed if desired as by using well known plastic zipper closure means or by heat sealing (not shown). Heat sealing is usually not necessary or desirable for the types of products involved. With the bag closed and sealed, the frame members or jaws 26 and 36 are further separated to release the bag which is then folded and tucked into the cardboard container 14, and the flaps on the container are closed and taped as desired for shipment or for some other purpose. The sterilant remaining in the bag 12 gradually escapes until little or none remains. It has been found that the smaller size containers such as 50 pound containers of spice will lose most of the sterilant contained therein in a relatively short time, not generally longer than a few hours or so. This loss occurs by the sterilant passing through the walls of the bag.

Tests made on containers of spices and food seasonings packaged and sterilized by the means and method described herein are safe to use and present little or no special fire or explosion hazard after a very short time period even when the sterilant used is highly flammable. Tests also indicate that little or no remaining residual sterilant exists in the product after about 12 hours. Other tests made to determine the bacteria count indicate that the remaining unkilled bacteria after a product has been treated by the present means and method is very small and in all cases has been substantially less than by any other known means or methods. Examples of typical bacteria counts for products sterilized by the subject method are often in a range of less than 100 bacteria per gram, and even lower counts can be achieved if harder vacuum pressures are used and if means are employed to increase the sterilant pressure and the application time during which the gaseous sterilant is injected into the bag. Furthermore, the substantially improved results obtained are achieved without any detectable loss of flavor or other damage to the product being sterilized. The very simplicity of the present device and process also makes them readily available for use even in moderate and small size businesses, and they can be used to sterilize almost any kind of a product including especially those mentioned above. The present device and process also lend themselves to being used on a production line basis or on a single package basis and in both cases the results obtained are comparable and there is little or no wastage of sterilant and the time required for each operation is relatively short.

The details of some typical results obtained by the present means and methods using ethylene oxide as the sterilant gas are set forth below for the named products:

A black pepper product in a 50 pound container having an untreated bacteria count of about 18 million per gram was sterilized by first drawing a vacuum pressure of 26 inches of mercury and thereafter injecting ethylene oxide gas centrally into the pepper. The resulting sterilized product had a measured bacteria count of 120 per gram.

Another test made on black pepper having an untreated bacteria count of 2.3 million per gram and an untreated yeast and mold count of 53000 per gram, after treatment using the same vacuum pressure of 26 inches of mercury and the same sterilant gas had an after treatment bacteria count of 350 per gram and an after treatment yeast and mold count of less than 10 per gram. When the same untreated black pepper was treated using a vacuum pressure of only 15 inches of mercury instead of 26, the after treatment product had a bacteria count of 600 per gram and a yeast and mold count of less than 10 per gram.

In the treatment of a poultry seasoning having a before treatment bacteria count of 1.1 million per gram, using a vacuum pressure of 26 inches of mercury and ethylene oxide as the sterilant, the after treatment bacteria count was measured as 20 per gram.

Similar treatment of a dill seed product having a before treatment bacteria count of 410,000 per gram yielded an after treatment count of 90 per gram. Similar results have been obtained for many other products and spices and for some products it has been possible to achieve substantially the same results but with less vacuum pressure. The examples set forth are representative and typical and clearly illustrate the effectiveness of the present means and process but are not intended to be exhaustive.

As indicated above the present device and process can be used to sterilize almost any quantity and weight product. However, for the larger amounts which require larger containers there is somewhat greater risk that more residual sterilant will remain in the product and in the container after sterilization and for longer periods of time. It is also recognized that in the larger bulk quantities it may take more time for the sterilant to kill the required numbers of bacteria. In some cases a day or even longer may be required. This may present problems especially where a spice merchant or other person using the subject means wishes to make delivery of the product but also wants to be certain that the product is in a safe condition from the standpoints of fire and explosion. The modified construction shown in FIG. 6 is designed to fill this need by including means to accelerate the removal of the remaining sterilant when desired.

In FIG. 6 the product in bulk form is in drum 120, which may be a 200 pound or larger drum, and the product is sterilized in the same way as described above. After being sterilized, however, because of the larger quantities of product and sterilant involved and the greater time required for the sterilant to act, the drum is allowed to sit for some period of time, usually much longer than required for the smaller containers. Time periods of from about 12 to 30 hours are typical to produce the desired bacteria kill. After this period the container 120 is repositioned in the modified device 122 and the upper end of bag 124, which is in the drum 120, is drawn out and repositioned between the jaws 126 and 128 in the same manner as described above. The jaws are then moved together to loosely engage and hold the bag, the bag is unsealed at its open end, and the probe 130 is reinserted into the product the same as before. Valve means 132 are operated to communicate the interior of the bag 124 to the vacuum suction pump 134 and a subatmospheric pressure is drawn in the bag to a desired vacuum pressure level. This removes much of the remaining sterilant. However, to be on the safe side the valve means 132 are moved to another position which communicates the probe assembly 130 and the interior of the bag with a source 136 of a back flushing gas which is preferably an inert gas such as nitrogen. The nitrogen introduced under pressure in this way passes through the valve means 132 and through the probe 130 and enters the product passing outwardly therethrough carrying with it any residual sterilant which may still be present in the product reducing the amount of remaining sterilant to a safe level. The nitrogen and the residual sterilant are now able to escape through the wall of the bag.

Nitrogen is preferred as a back flush gas because it is relatively inexpensive, readily available, inert and does not need to be heated. Other inert gases could also be used but they are more expensive and less available. Air can also be used as a back flush medium but if air is used it usually has to be heated or filtered, and both heating and filtering require additional equipment and heating may have an adverse effect on the flavor of the product which is usually carried by the oils in the product. Filtering is also disadvantageous because it requires maintenance and replacement of parts. The valve means 132 required when back flushing is provided may be similar to the valve means 88 shown in FIG. 3 except that an additional operating position and an additional input connection to the source of back flushing gas are required.

Thus there has been shown and described several embodiments of novel means for sterilizing spices, food seasonings and other products which fulfill all of the objects and advantages sought therefor. Many changes, modifications, variations and other uses and applications of the subject means will however become apparent to those skilled in the art after considering this specification and the accompanying drawings. All such changes, variations, modifications and other uses and applications which do not depart from the intention and scope of the invention are deemed to be covered by the invention which is limited only by the claims which follow.

What is claimed is:

1. An apparatus for sterilizing spices, food seasonings and like products while in a bag-like container comprising means to support the bag-like container including a pair of relatively movable clamp members movable into engagement with opposite sides of the bag-like container to sealably close the container with the product therein, a source of gaseous sterilant and means for introducing sterilant from said source into the container, said last named means including a tubular member having an opening adjacent to one end and an opposite end, means connected to said opposite end communicating the tubular member with the source of gaseous sterilant, said tubular member being movable to a position extending into the container between the pair of clamp members to a position in which the opening in said one end of the tubular member is surrounded by the product to be sterilized.

2. The apparatus of claim 1 including vacuum pumping means and means to alternatively communicate the tubular member with a vacuum pumping means and to isolate the tubular member from the source of gaseous sterilant.

3. The apparatus of claim 2 including a source of a back flushing gas and valve means to selectively communicate the source of back flushing gas, the vacuum pumping means and the source of gaseous sterilant with the tubular member.

4. The apparatus of claim 3 wherein the source of back flushing gas is a source of an inert gas.

5. The apparatus of claim 3 wherein the source of back flushing gas is a source of nitrogen.

6. The apparatus of claim 1 wherein at least one of said clamp members has a relatively resilient cushioning overlayer thereon for engaging the bag.

7. The apparatus of claim 1 wherein the source of gaseous sterilant is a source of ethylene oxide.

8. Means for sterilizing products such as products in powder, granular and spice-like form while the product is in a bag having an open end comprising a source of sterilizing substance and a vacuum pressure source, a probe having a first end including means for connecting said first end to a conduit, said probe having an opposite free end with an opening therein, the probe being insertable into the product in the bag through the bag opening to a position such that the free end of the probe is at an intermediate location in the product, means to clamp the bag adjacent to the open end thereof with the probe extending therein, said clamp means including means to seal the bag closed around the probe, multi-position valve means connected to the opposite end of the conduit from the probe, other conduit means connecting the valve means to the source of sterilizing substance and to the vacuum pressure source, and means to change the condition of the valve means to selectively establish communication between the probe, the vacuum pressure source and the source of sterilant substance.

9. The means of claim 8 including a source of an inert substance, and means connecting said source of inert substance to the valve means, said valve means having a position establishing communication between the source of inert substance and the probe.

10. The means of claim 9 wherein the source of inert substances is a source of inert gas.

11. The means of claim 8 wherein the sterilant source is a source of a gaseous sterilant.

12. The means of claim 8 wherein the sterilant source is a source of ethylene oxide.

13. The means of claim 8 wherein the probe is an elongated tubular member having a relatively flat cross section over a portion of the length thereof, and screen means extending over the opening in the free end thereof to minimize the possibility for the product being sterilized entering the probe.

14. The means of claim 8 wherein the clamp means include a pair of relatively movable jaw members each having a pad thereon formed of a relatively compressible resilient substance, said pads being engageable with opposite sides of the bag to sealably close the bag.

15. An apparatus for sterilizing spices, food seasonings and other like products of a powdery, granular flaky, leafy or similar characteristic, said product being in a bag-like container comprising a pair of relatively movable clamp members for engaging and sealably closing the bag-like container with the product to be sterilized therein, means to selectively establish a subatmospheric condition or for introducing a gaseous sterilant into the bag-like container, said last named means including a hollow probe member having a free end with an opening therethrough and an opposite end, a conduit and valve means connected to the opposite end of the probe member, a source of gaseous sterilant and vacuum pump means connected to the valve means, said valve means including means to selectively communicate the probe member with the sterilant source and the vacuum pump means, said probe member being insertable into the bag-like container and into the product to be sterilized therein between the clamp members.

16. A process fpr sterilizing food products packaged in bags comprising the steps of:

supporting a bag containing a product to be sterilized with the open end of the bag extending between cushioned clamping members, inserting into the bag and into the product to be sterilized and between the cushioned clamping members a probe which has an outlet opening adjacent to the inserted end thereof, moving the cushioned clamping members against the bag and against the probe to seal the bag closed while the probe is inserted therein, operating multi-positioned valve means to a first position communicating the probe and the interior of the bag with a vacuum pressure pumping means to reduce the pressure in the bag to a predetermined subatmospheric pressure, moving the multi-position valve means to a second position discontinuing communication between the vacuum pumping means and the probe, thereafter moving the multi-position valve means to a third position communicating the probe and the interior of the bag with a source of gaseous sterilant for introduction therein, relieving some of the pressure produced by the cushioned clamping members against the probe, and withdrawing the probe from the bag and from the product therein.

* * * * *